United States Patent
Mills et al.

(10) Patent No.: US 8,001,081 B1
(45) Date of Patent: Aug. 16, 2011

(54) DETERMINING PRIORITY BETWEEN DATA ITEMS IN SHARED ENVIRONMENTS

(75) Inventors: William L. Mills, Yacolt, WA (US); Thomas C. Butler, Santa Clara, CA (US); Uma D. Gouru, Santa Clara, CA (US); Atul Gupta, San Jose, CA (US); Jayita Poddar, Sunnyvale, CA (US); Gerard G. Pallipuram, Cupertino, CA (US); Alvin I. Pivowar, Camas, WA (US)

(73) Assignee: Access Co., Ltd., Tokyo (JP)

( * ) Notice: Subject to any disclaimer, the term of this patent is extended or adjusted under 35 U.S.C. 154(b) by 394 days.

(21) Appl. No.: 10/972,965

(22) Filed: Oct. 21, 2004

Related U.S. Application Data

(63) Continuation-in-part of application No. 10/159,461, filed on May 31, 2002.

(51) Int. Cl.
   *G06F 7/00* (2006.01)
   *G06F 17/00* (2006.01)
(52) U.S. Cl. .................................. 707/624; 707/646
(58) Field of Classification Search .................. None
   See application file for complete search history.

(56) References Cited

U.S. PATENT DOCUMENTS

| | | | |
|---|---|---|---|
| 6,330,568 B1 | 12/2001 | Boothby et al. | 707/201 |
| 6,343,299 B1 | 1/2002 | Huang et al. | 707/203 |
| 6,449,622 B1 | 9/2002 | LaRue et al. | 707/201 |
| 6,493,725 B1 | 12/2002 | Iwai et al. | 707/201 |
| 6,532,480 B1 | 3/2003 | Boothby | 707/201 |
| 6,581,075 B1 * | 6/2003 | Guturu et al. | 707/201 |
| 2001/0001870 A1 | 5/2001 | Ofek et al. | 711/112 |
| 2001/0048728 A1 | 12/2001 | Peng | 375/354 |
| 2002/0069220 A1 | 6/2002 | Tran | 707/503 |
| 2002/0129007 A1 | 9/2002 | Kobayashi et al. | 707/1 |
| 2002/0161735 A1 | 10/2002 | Cheng et al. | 707/1 |
| 2004/0078370 A1 | 4/2004 | Acree et al. | 707/8 |

OTHER PUBLICATIONS

Citrix image synchronization counters, 2000.*
Christian Neusius, Adapting synchronization counters to the requirements of inheritance, 38-44.*

* cited by examiner

*Primary Examiner* — Cam Y T Truong
(74) *Attorney, Agent, or Firm* — Berry & Associates P.C.

(57) ABSTRACT

One embodiment of the invention enables nodes or endpoints that have been involved with synchronization of data items to determine which version of a data item (if any) has priority over another version of that same data item. For example, one embodiment of the invention can include a method that can include the determination as to whether any data items have matching identities and conflicting priorities after the synchronization process. Provided a first and second data items have matching identities and conflicting priorities, a determination is made as to whether an indication had been made that the first data item is desirable over the second data item. Provided the indication had been made that the first data is desirable over the second data item, it is indicated that the first data item has priority over the second data item.

9 Claims, 11 Drawing Sheets

DETERMINING PRIORITY BETWEEN DATA ITEMS IN SHARED ENVIRONMENTS

CROSS REFERENCE TO RELATED APPLICATIONS

This patent application is a continuation-in-part of the co-pending U.S. patent application Ser. No. 10/159,461 which is entitled "Determining Priority Between Data Items" by William L. Mills et al., filed on May 31, 2002, and assigned to the assignee of the present application, is incorporated herein by reference.

BACKGROUND

In the realm of handheld computer systems (commonly referred to as personal digital assistants or PDAs), it is not uncommon for a data set to exist and be maintained both on the PDA and on at least one other computing device. For example, a user may maintain a calendar or address book on both his or her PDA and on another computer system (e.g., a personal computer system such as a desktop or laptop).

The entries in the data set can be referred to as records or data objects. When a change is made to a record in the data set residing on one device (hereinafter, also referred to as a node), it is desirable to have the data set on the other node be updated as well, so that the data set is synchronized on both nodes. Accordingly, processes have been developed to facilitate synchronizing the data sets on both nodes. These synchronization ("sync") processes are known in the art.

Currently, each record in a data set may be identified by a unique record identifier (record ID). To prevent duplication of record IDs, the task of assigning IDs to records is relegated to the PDA.

Generally, synchronization is performed using either a "slow sync" technique or a "fast sync" technique. Using a slow sync, all of the records are transferred between nodes; the data set on one node is transferred to the other. The records in each data set are then compared in order to determine which records have changed since the last sync, and the respective data sets are updated accordingly.

Fast syncs are accommodated by tagging records when they are modified. Typically, a bit associated with each record is set to one value or another to indicate whether or not that record has been changed since the last sync; the bits that have been set are often referred to as "dirty" bits. Using a fast sync, only the changes made to the data set on each node since the last sync are transferred to the other node. After the fast sync is performed, the dirty bits are cleared.

Although fast syncs are preferred, there are occasions when slow syncs need to be performed. For instance, it is becoming more common for people to use more than one computer system. Many people use a computer system at home and another one at work, for example. If a user performs a fast sync between the PDA and one of the computer systems, the dirty bits would be cleared. Consequently, the records on the PDA that have changed cannot be identified using the dirty bits. Therefore, a subsequent sync between the PDA and another computer system will use a slow sync to identify changes made to the records since the last time these latter two nodes had been synched.

Thus, one problem with the common synchronization techniques is that slow syncs are occurring more frequently as a growing number of people interact with multiple computer systems with their PDA. Slow syncs take longer to complete than fast syncs, and so they are less desirable. Also, the time needed to complete slow syncs is increasing as memory sizes increase for PDAs.

Another issue with typical synchronization techniques is that they are limited with respect to the different types of syncs that can now occur. Traditionally, synchronization occurs between a PDA and one or more personal computer systems as described above. However, the paradigm in which the PDA serves in essence as the nexus between the user's home and office computer systems is not as applicable as it once was. As computer systems are networked, multiple communication pathways between PDAs and computer systems can exist, and synchronization between multiple devices needs to be supported. The notion of a single source (e.g., the PDA) for record IDs is not as workable as before.

Also, records are frequently shared between users and quite often are distributed and stored across many nodes. Some records may be accessible by multiple users working from different nodes. In any event, different users may update a record in different ways, and the modified record may be distributed over different pathways. Along the way, the record may be further modified. As a result, different versions of the same record may reach a node, causing a conflict to arise as to which version of the record should take precedence over another. Using contemporary synchronization techniques, these records are unnecessarily replicated at the destination node, slowing down syncs while consuming memory. User intervention is then usually required to glean which records are correct and which can be discarded.

SUMMARY

One embodiment of the invention enables nodes or endpoints that have been involved with synchronization of data items to determine which version of a data item (if any) has priority over another version of that same data item. For example, one embodiment of the invention can include a method that can include the determination as to whether any data items have matching identities and conflicting priorities after the synchronization process. Provided a first and second data items have matching identities and conflicting priorities, a determination is made as to whether an indication had been made that the first data item is desirable over the second data item. Provided the indication had been made that the first data is desirable over the second data item, it is indicated that the first data item has priority over the second data item.

While a particular embodiment of the present invention has been specifically described within this summary, it is noted that the invention is not limited to this embodiment. The invention is intended to cover alternatives, modifications and equivalents which may be included within the scope of the invention as defined by the Claims.

DETAILED DESCRIPTION

Figure 1:
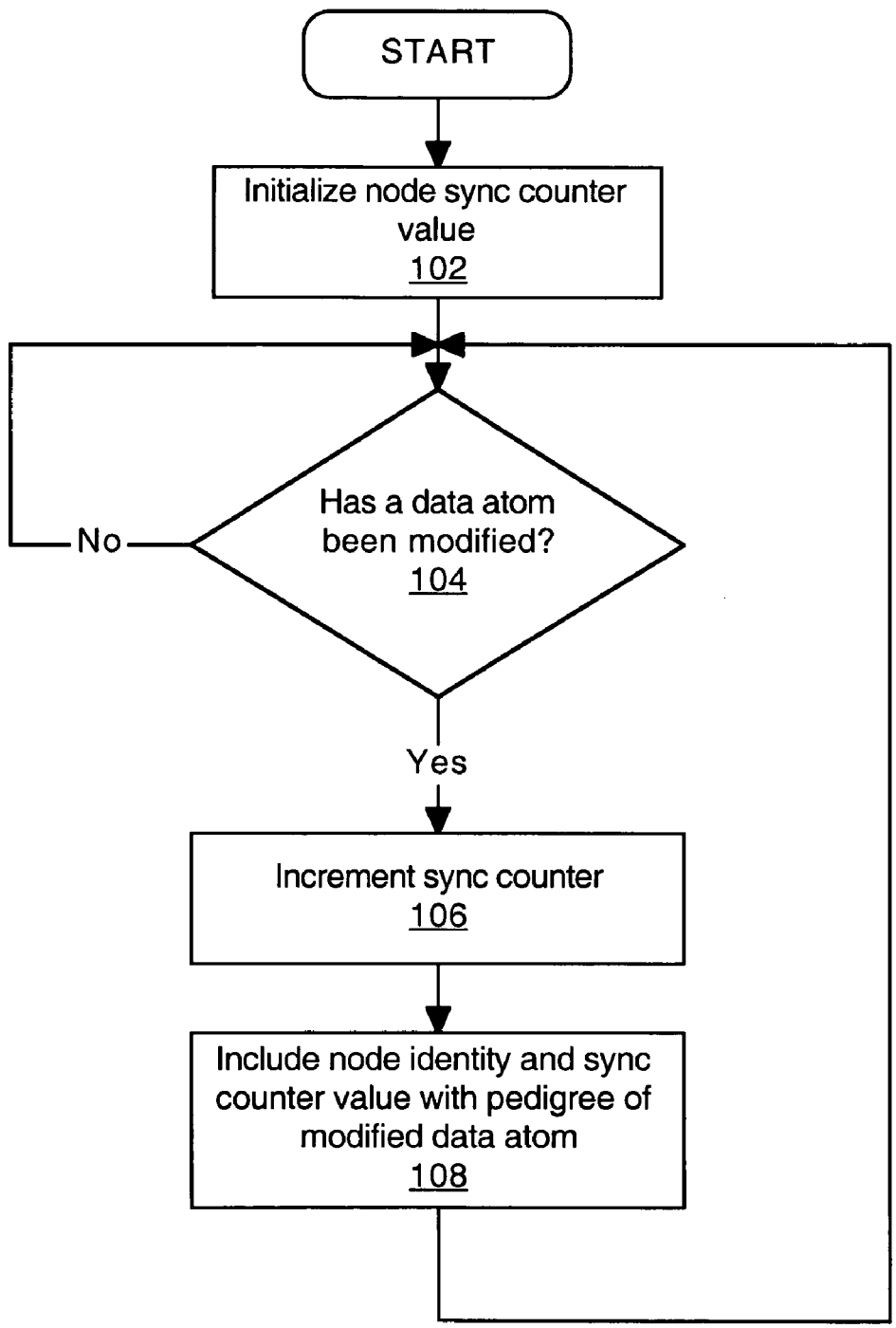
FIG. 1 is a flowchart of a method in accordance with embodiments of the invention for utilizing a synchronization counter (or sync clock) and a pedigree of a data atom.

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the scope of the invention as defined by the claims. Furthermore, in the following detailed description of embodiments in accordance with the invention, numerous specific details are set forth in order to provide a thorough understanding of the invention. However, it will be evident to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computing system or digital system memory. These descriptions and representations are the means used by those skilled in the art to most effectively convey the substance of their work to others skilled in the art. A procedure, logic block, process, etc., is herein, and generally, conceived to be a self-consistent sequence of operations or instructions leading to a desired result. The operations may involve physical manipulations of physical quantities. Usually, though not necessarily, these physical manipulations take the form of electrical or magnetic signals capable of being stored, transferred, combined, compared, and otherwise manipulated in a computing system or similar electronic computing device. For reasons of convenience, and with reference to common usage, these signals may be referred to as bits, values, elements, symbols, characters, terms, numbers, or the like with reference to the present invention.

Bear in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "mapping", "merging", "binding", "linking", "determining", "transmitting", "receiving", "generating", "creating", "utilizing", "storing" or the like, refer to the action and processes of a computing system, or similar electronic computing device, that manipulates and transforms data. The data is represented as physical (electronic) quantities within the computing system's registers and memories and can be transformed into other data similarly represented as physical quantities within the computing system's memories or registers or other such information storage, transmission, or display devices.

Synchronization is generally a process by which a plurality of copies of a database are maintained such that the information in all copies is the same, or synchronized. The copies need not be bit for bit identical. A synchronization process can accommodate different file structure, operating system and data media requirements. The copies are frequently on different computer systems, but it is sometimes desirable to maintain separate, synchronized databases on the same computer system. Synchronization allows, for example, additions, deletions and/or changes made to one copy of a database (also known as mutations), for example a copy on a handheld computer, to be reflected to all copies.

These database copies can be referred to as "endpoints" or "farpoints" or "nodes". At other times, the term "node" may be used to describe an entity, for example a computer system, comprising multiple endpoints. An endpoint is generally a source or destination of records (e.g., individual data items) to be synchronized. For example, it is commonplace to synchronize a desktop calendar system database with a calendar database on a handheld computer. In this example, the calendar database on the desktop computer is an endpoint, and the handheld calendar database is another endpoint. Endpoints can generally be data structures in permanent, or semi-permanent computer memory, such as battery powered volatile memory (e.g., RAM) in a handheld computer or magnetic media within a desktop computer. However, endpoints may be temporary, such as, a buffer in a wireless data protocol stack, but is not limited to such.

The entries in a data set can be referred to as records, data objects, or data items. When a change is made to a record in the data set residing on one device or node such as a handheld computer, it can be desirable to have the same data set on another device or node such as a computer system be updated as well, so that the data set is synchronized on both nodes. Within embodiments in accordance with the invention, the first abstraction applied to this type of synchronization can be to model the data flow. For example, each place that stores data, even if only transiently, can be modeled as a node. Nodes that exchange data can be coupled nodes. One or more handheld computing devices can each be a node. More specifically, each of their data stores may be a node. A desktop viewer (such as Palm Desktop) with its data cache can be a node. A data-sharing server can be a node. A HotSync® synchronization between Palm Desktop and a cradled handheld computing device can be a coupling edge between the two nodes.

It is noted that if a sync flow graph contains loops, then it is possible for a given piece of data to arrive at a node via two different pathways and with arbitrary timing. If the data from the two pathways differs, then the task of resolving the difference may potentially need more information about the sequence, timing, and locale of changes made to the data enroute.

Within embodiments in accordance with the invention, another abstraction applied to synchronization can be to model the data as independent atoms. This abstraction leaves out the notions of data creation and destruction. It assumes the data already exists and can be modified and passed along. A data atom may have two properties of interest. For example, it can have an identity and comparable content.

The identity property can mean that two data atoms can be examined and it can be determined that they represent either the same piece of data, or not. The content property can mean that two data atoms with matching identity can be further compared for content. Within an embodiment, the content is either equal, or it is not. It should be noted that a data atom may be, but is not limited to, a record or a field of a record. Since both may be identified and compared for content, either one may be a data atom.

When a data atom is modified, it may be referred to as a mutation. Copies may or may not get exchanged, perhaps unidirectionally, when nodes communicate. When a data atom is modified, the original may be referred to as the ancestor and the mutation may be referred to as the descendant. The concept extends to multiple generations of mutations. Furthermore, a mutation may be presumed desirable. That is, some user or some knowledgeable process changed the data intentionally with a fidelity expectation that the system would retain that change. Therefore, priority may be presumed for any mutation over any of its ancestors. This presumption may be referred to as the presumption of deliberateness.

When a node has two data atoms with equal identity but unequal content, that can be referred to as a disparity. There may be two kinds of disparities. For example, in an ordered disparity, one of the atoms is the ancestor of a descendant derived by one or more mutations from the ancestor. The presumption of deliberateness can allow assignment of priority to the descendant.

The second kind of disparity is an unordered disparity. Neither data atom is the descendant of the other and may not be resolved via the presumption of deliberateness. An unresolved disparity, whether ordered or unordered, is a conflict. An ordered disparity may be resolved without violating fidelity expectations by removal of the ancestor and retention of the descendant. However, an unordered disparity may not be resolved without violating some previous fidelity expectation. Within an embodiment, unordered disparities may be resolvable by an external agent, that possesses additional information. It should be understood that the external agent acts on the data to produce a mutation it favors, thus introducing the missing "deliberateness" needed to resolve a disparity. Functionally, sync can resolve ordered disparities while detecting unordered disparities.

Embodiments in accordance with the invention can enable nodes or endpoints involved with synchronization of data items to determine which version of a data item or atom (if any) has priority over another version of that same data item. When a data item is modified by a node, it may be presumed that the modified data item takes priority over the previous version of that data item or atom. Therefore, the "descendant" data item (modified) can take precedence over its "ancestor" data item (previous version). By including this type of "pedigree" information with data items involved with synchronization between different nodes or endpoints, embodiments in accordance with the invention enable determination as to which version of a data item (if any) has priority over another version(s) of that same data item.

For example, a "pedigree" can be a "change history" of a data atom, and may be used to indicate if the data atom has changed since a synchronization session. Within embodiments in accordance with the invention, a "synchronization counter" or "sync counter" may be used to establish a pedigree of a data atom. It is noted that the sync counter may also be referred to as a "synchronization clock" or "sync clock." A sync counter (or clock) can be implemented in a wide variety of ways. For example, a sync counter may be a positive integer value that increases monotonically with each synchronization action. Alternatively, a sync counter (or clock) can be implemented to moved forward or be incremented by any defined value with each synchronization action. It is appreciated that the value of a synchronization counter need have no relation to actual time. A synchronization counter may be viewed as a label for a period of time between synchronizations.

Furthermore, a sync counter may be maintained for an individual database or node. Such individual sync counters may be useful when databases are synchronized within a computer device or when all databases are not synchronized at the same time. A single sync counter may also be maintained by and for a single computer system. A sync counter can be advanced at each synchronization (unless no changes have occurred since a prior synchronization). However, the sync counter can be advanced more frequently, for example at each synchronization or at each modification of a data atom. Alternatively, the sync counter may just be advanced when the first data atom is modified within a node after a sync.

Using sync counters, a pedigree may be created by combining the count (or value) of a sync counter and an identifier of a node, a database or a device. This information can be then associated with a data atom when the data atom is created or modified. For example, a desk top computer (e.g., 1100 of FIG. 11) may use the letter "D" as its identifier. When a database record (e.g., an appointment) is created, the sync counter may have a value of "21." Consequently, the database record may be assigned a pedigree of "D21" to indicate that the record was created on the desk top computer "D" while the desk top computer's sync counter value was equal to 21.

As another example, assume that the desk top computer (e.g., 1100 of FIG. 11) synchronizes with a handheld computing device (e.g., 1000 of FIG. 10), receiving a copy of the exemplary appointment data record during the process. A change to this record performed on handheld computer may append handheld computer's identification and value of its current sync counter to previously included pedigree information. Thus, the pedigree for the now modified data record may be "D21H43," where the "H43" portion represents an identifier for the handheld computer "H" and the value of its sync counter "43" at the time of the modification. It is appreciated that the embodiments in accordance with the invention are well suited to include an identifier and sync counter value with previous pedigree information of a data atom, record, or data object in a wide variety of ways. For example, embodiments in accordance with the invention can append, prepend and/or utilize mathematical combinations in order to include an identifier and sync counter value with previous pedigree information of a data atom.

It should be appreciated that it is possible, in some systems perhaps common, that two data atoms that are unordered because they separately mutated from a common ancestor, can mutate to become equal in content. For example, someone's phone number changes and is updated in two separate mode locations which are later synced. In this case, there is no disparity but the data atoms have a different pedigree. Embodiments in accordance with the invention can allow the two data atoms to be merged into a single data atom having a merged pedigree. This merged atom can then have priority over the ancestors of either original data atom.

Within embodiments in accordance with the invention, an external agent or process that seeks to resolve conflicts may do so by means of convergent mutations. For example, if an address book entry has two mutations, one with a changed phone extension and one with a changed electronic mail (e-mail) address, an intelligent agent might choose to resolve the conflict by producing a blended address book entry that includes both the changed phone extension and the changed email. The desired goal can be for the blended entry to have priority over both original mutations. Therefore, both items mutate into a new blended content that includes the combined pedigree resulting in a convergent mutation.

FIGS. 1, 2, 3, 4, 5, 6, 7, 8 and 9 each include flowcharts 100, 200, 300, 400, 500, 600, 700, 800 and 900, respectively, of methods in accordance with embodiments of the present invention. Flowcharts 100-900 each includes processes of embodiments of the present invention which can be carried out by a processor(s) and electrical components under the control of computer readable and computer executable instructions (or code). The computer readable and computer executable instructions (or code) may reside, for example, in data storage features such as computer usable volatile memory, computer usable non-volatile memory and/or computer usable mass data storage. However, the computer readable and computer executable instructions (or code) may reside in any type of computer readable medium. Although specific operations are disclosed in flowcharts 100-900, such operations are exemplary. That is, each flowchart of flowcharts 100-900 may not include all of the operations illustrated by its respective figure. Alternatively, each flowchart of flowcharts 100-900 may include various other operations and/or variations of the operations shown by its respective figure. It is noted that the operations of flowcharts 100-900 can each be performed by software, by firmware, by hardware or by any combination thereof.

FIG. 1 is a flowchart 100 of a method performed in accordance with embodiments of the present invention for utilizing a synchronization counter (or sync clock) and a pedigree of a data atom. For example, when a data atom at a data node mutates, it can be marked with the current node identity and value of that node's sync counter. This marking does not replace the markings from any different sync counter, but it may replace any older marking from the current sync counter. The pedigree of a data atom may then be coded at all of the different nodes at which it has mutated along with the counter value of its most recent mutation at that node.

Additionally, marking a data atom with a sync counter can assert deliberateness. It can state that a user or other external agent mutated a data atom with an expectation (or fidelity) that the mutation would be preserved over any previous value that data atom had at that node. A system for detecting and resolving disparities within the present embodiment usually depends upon a mark having this type of meaning. It is noted that the pedigree marks can be made when the presumption of deliberateness is valid. The pedigree information of a data atom can be the set of sync counter markings attached to and/or associated with it.

At operation 102 of FIG. 1, a sync counter (or clock) of a node is initialize to a value. It is noted that operation 102 can be implemented in a wide variety of ways. For example, the value of the sync counter can be initialize to a value equal to zero. Furthermore, the value of the sync counter can be initialize at operation 102 to any predefined value.

At operation 104, a determination is made as to whether a data atom (or item) has been modified (or edited) within the node. If it is determined at operation 104 that a data atom has not been modified within the node, process 100 proceeds to the beginning of operation 104. However, if it is determined at operation 104 that a data atom has been modified within the node, process 100 proceeds to operation 106.

At operation 106 of FIG. 1, the node sync counter (or clock) is incremented or forwarded by a particular value. It is appreciated that the node sync counter may be incremented or forwarded in diverse ways. For example, the node sync counter of the present embodiment can be advanced by an integer value of one. Alternatively, the node sync counter value may be advanced with any type of floating point number or integer number. Furthermore, the node sync counter value may be advanced by sampling a real-time clock value.

Within process 100, the sync counter can be advanced when any data atom is modified. However, the present embodiment is well suited for implementations that advance (or increment) less frequently so long as the sync counter can be advanced the first time a data atom is modified after a sync. It is understood that the sync counter of flowchart 100 may be advanced (or incremented) in any manner described herein.

At operation 108 of FIG. 1, the node's identity and its current sync counter value are included as part of the pedigree of the modified data atom. It is understood that the pedigree of the modified data atom (or item) can be implemented in any manner similar to that described herein, but is not limited to such. Once operation 108 has been completed, the process 100 proceeds to the beginning of operation 104.

Figure 2:
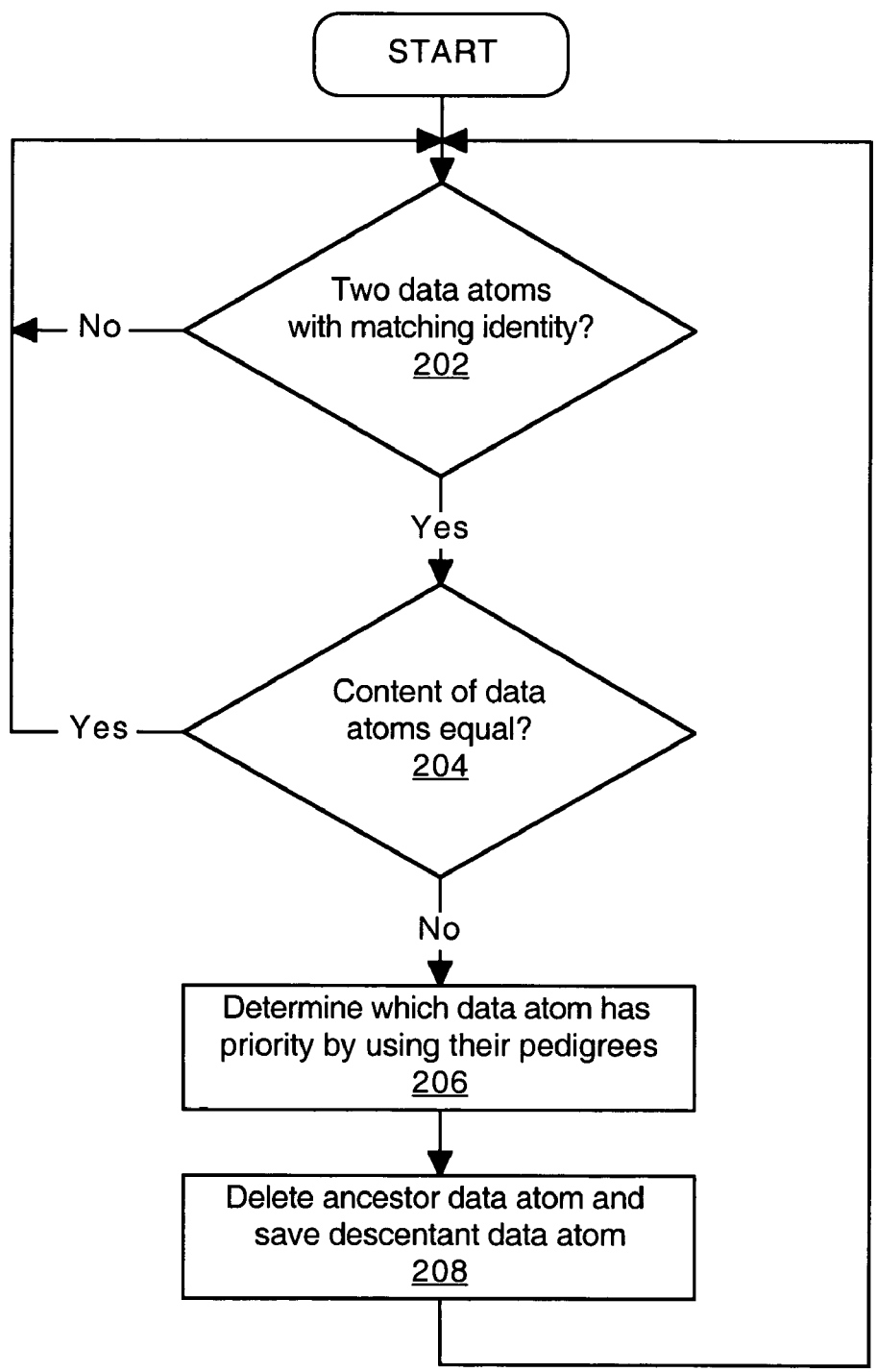
FIG. 2 is a flowchart of a method in accordance with embodiments of the present invention for enabling determination of priority between two data atoms.

FIG. 2 is a flowchart 200 of a method performed in accordance with embodiments of the present invention for enabling determination of priority between two data atoms. For instance, comparing the sync counter markings for two data atoms can be sufficient to determine whether one is descendant from the other. For example, for each sync counter marking attached to (or associated with) an ancestor data atom, a descendant data atom may have the same sync counter with an equal or greater value. In another case (e.g., unordered disparity), a sibling data atom may have at least one sync counter marking of lower value and one sync counter marking of higher value.

At operation 202, a determination is made as to whether the identities of two data atoms match (or are the same). If it is determined at operation 202 that the identities of the two data atoms do not match (or are dissimilar), process 200 proceeds to the beginning of operation 202. However, if it is determined at operation 202 that the identities of the two data atoms do match (or are similar), process 200 proceeds to operation 204.

At operation 204 of FIG. 2, a determination is made as to whether the content of the two data atoms are equal or match. If it is determined at operation 204 that the content of the two data atoms are equal (or match), process 200 proceeds to the beginning of operation 202. However, if it is determined at operation 204 that the content of the two data atoms are unequal (or unmatched), process 200 proceeds to operation 206.

At operation 206, a determination is made as to which data atom has priority by using each of their pedigrees. It is understood that the pedigrees of both data atoms can be compared by the present embodiment in order to determine which data atom is the descendant and which one is the ancestor. This determination at operation 206 may be done in any manner similar to that described herein. Once this is determined, it is appreciated that the descendant data atom takes priority over its ancestor data atom. Note that it is possible that neither data atom has priority at operation 206. As such, the data atoms can be referred to as "conflicting" data atoms. How conflicting data atoms can be handled in accordance with embodiments of the invention are described herein.

At operation 208 of FIG. 2, the present embodiment deletes (or disregards) the ancestor data atom and stores (or uses) the descendant data atom for future use. Once operation 208 is completed, process 200 proceeds to the beginning of operation 202.

It is understood that the process 200 may occur within a node during (or as part of) a synchronization process between the node and another node. Alternatively, the process of process 200 may occur within a node after a synchronization process between the node and another node.

Figure 3:
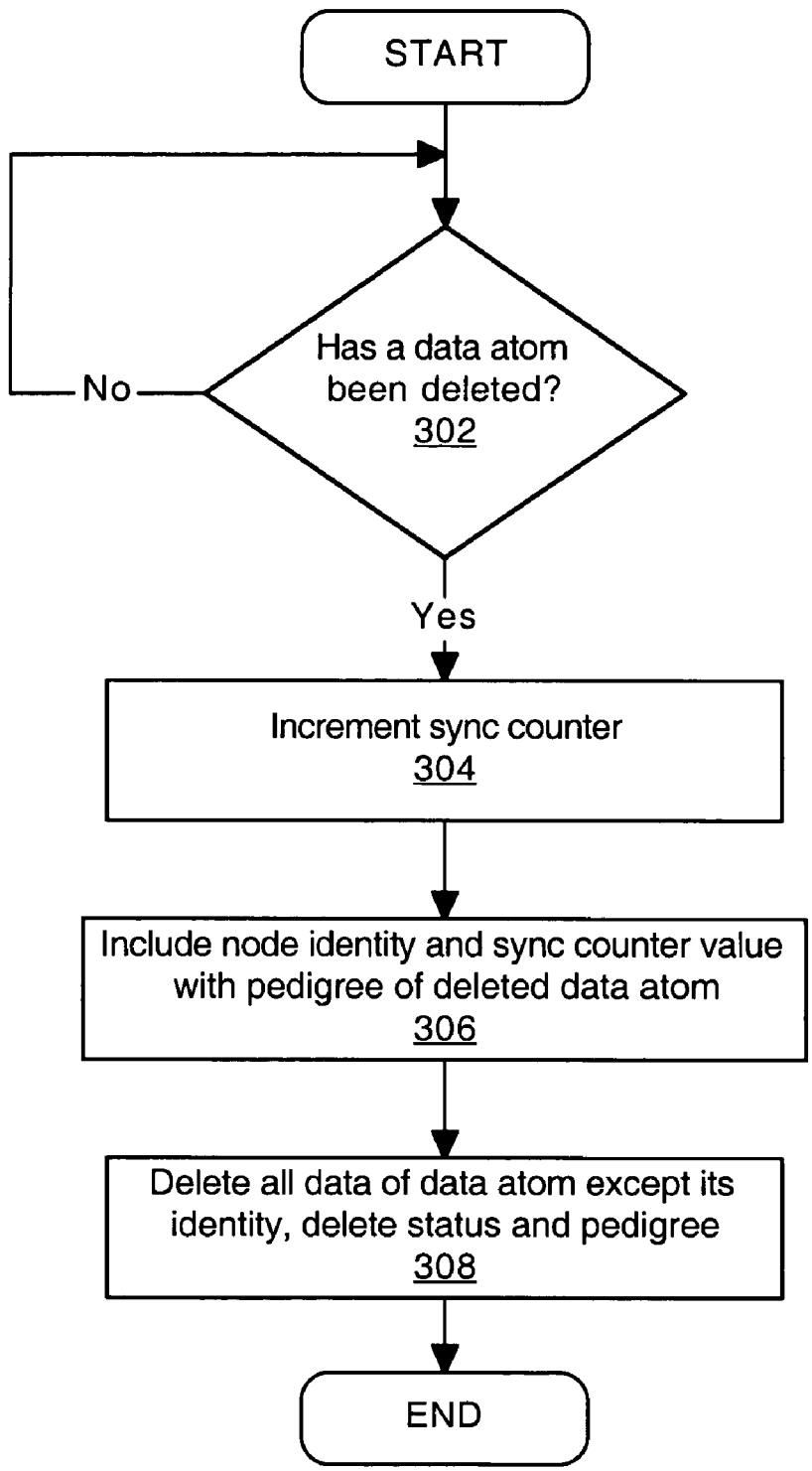
FIG. 3 is a flowchart of a method in accordance with embodiments of the present invention for handling data atoms that have been deleted by a node.

FIG. 3 is a flowchart 300 of a method in accordance with embodiments of the present invention for handling data atoms that have been deleted within a node. It should be appreciated that it may become burdensome to a node to maintain complete data atoms of which have been previously deleted within the node. As such, flowchart 300 may be viewed as an optimization process. For example, process 300 can optimize storage of deleted data atoms by saving their identity information, deleted status, and their pedigrees while deleting any other information associated with them. Therefore, when a sync process occurs with another node, it may also optimize its storage of deleted data atoms.

At operation 302, a determination is made as to whether a data atom has been deleted within a node. If it is determined at operation 302 that a data atom has not been deleted within the node, process 300 proceeds to the beginning of operation 302. However, if it is determined at operation 302 that a data atom has been deleted within the node, process 300 proceeds to operation 304.

At operation 304 of FIG. 3, the node sync counter (or clock) value is incremented or advanced by a particular value. It is appreciated that the node sync counter may be incremented or forwarded in a wide variety of ways. For example, the node sync counter of the present embodiment can be advanced by an integer value of one. Alternatively, the node sync counter value may be advanced with any type of floating point number or integer number. Moreover, the node sync counter value may be advanced by sampling a real-time clock value.

At operation 306, the node identity and sync counter value are included with the pedigree of the deleted data atom. At operation 308, all of the data associated with the deleted data atom is deleted except for its identity, deleted status, and its pedigree which all may be referred to as a deleted data atom "stub". In this manner, when a sync process occurs with another node, that node may also optimize its storage by modifying the "deleted" data atom into a deleted data atom "stub". Additionally, this can prevent the "deleted" data atom from being re-established within the node that initially deleted it. Once operation 308 is completed, process 300 can be exited.

Figure 4:
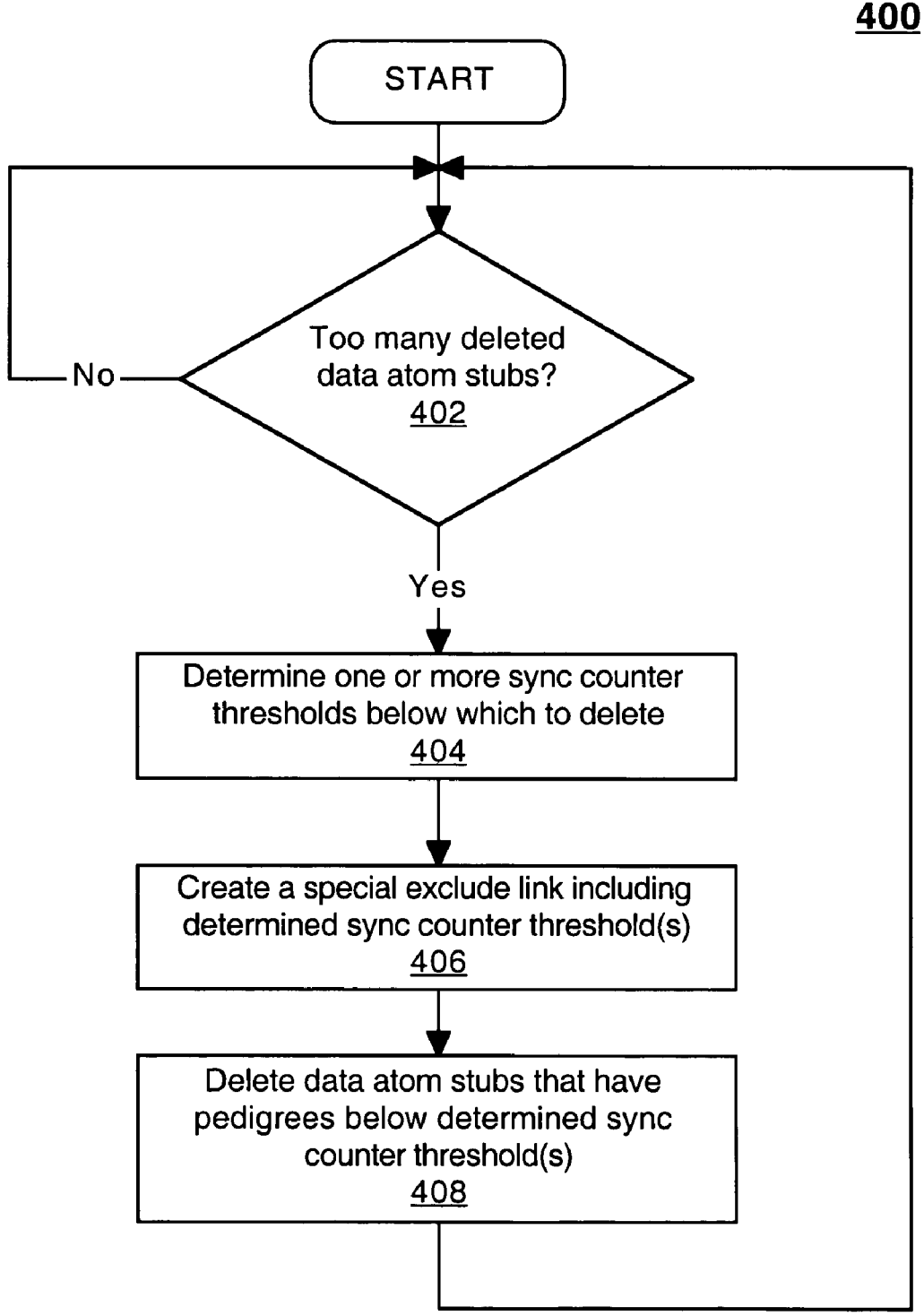
FIG. 4 is a flowchart of a method in accordance with embodiments of the present invention for enabling a node to manage completely deleted data atoms.

FIG. 4 is a flowchart 400 of a method in accordance with embodiments of the present invention for enabling a node to manage completely deleted data atoms. For example, flowchart 400 can enable further optimization by completely removing deleted data atoms from a node by utilizing a determined pedigree of sync counters to designate which data atoms to remove. The pedigree of sync counters can be utilized to create a special exclude link which subsequently indicates to one or more nodes which type of data atoms were completely removed.

It is noted that process 400 specifically operates with deleted data atom "stubs" (that include each data atom's identity, delete status and pedigree). However, process 400 is well suited to operate with data atoms that are to be deleted in the same manner it operates with deleted data atom "stubs".

At operation 402 of FIG. 4, a determination can be made as to whether there are too many deleted data atom "stubs" within the node. If it is determined at operation 402 that there are not too many deleted data atom stubs within the node, process 400 proceeds to the beginning of operation 402. However, if it is determined at operation 402 that there are too many deleted data atom stubs within the node, process 400 proceeds to operation 404.

At operation 404, one or more node identities and one or more sync counter thresholds can be determined that are associated with the pedigrees of the deleted data atom stubs. It is understood that the determined node identity (or identities) and corresponding sync counter threshold(s) can be subsequently used to completely remove one or more deleted data atom stubs from the node. For instance, any deleted data atom stub that has a node identity (or identities) with a sync counter value(s) within their pedigree equal to or less than the determined sync counter threshold(s) associated with the determined node identity (or identities) can be completely removed from the node. For example, given that the sync counter of computer "D" and handheld computing device "H" are currently equal to "D136" and "H155," respectively, a determination may be made that too much storage space within the node is being used by deleted data atom stubs at or below threshold levels "D34" and "H39." As such, the threshold levels "D34" and "H39" may later be utilized to remove specific deleted data atom stubs from the node.

At operation 406 of FIG. 4, a special exclude link is created (or generated) which includes the determined node identity (or identities) and sync counter threshold(s) for the deleted data atom stubs. In this manner, when a synchronization occurs between two nodes, the special exclude link of the first node can indicate to the other node which deleted data atom stubs were completely removed from the first node. Additionally, the special exclude link may also cause the second node to completely remove those deleted data atom stubs from itself that correspond to the special exclude link and also cause the creation of its own special exclude link.

At operation 408, the deleted data atom stubs are completely removed that have specific node identities with sync counters within their pedigrees equal to or less than the determined sync counter threshold(s) associated with the determined node identity (or identities). In this manner, memory space within the node may be freed up for different functionality include, but not limited to, storing other active data atoms and their associated pedigrees. Once operation 408 is completed, process 400 can return to the beginning of operation 402.

It is appreciated that depending on the implementation of the advancement of node sync counters, operation 408 may be implemented such that the deleted data atom stubs are completely removed that have specific node identities with sync counters within their pedigrees equal to or greater than the determined sync counter threshold(s) associated with the determined node identity (or identities). Alternatively, operation 408 may be implemented such that the deleted data atom stubs are completely removed that have specific node identities with sync counters within their pedigrees greater than the determined sync counter threshold(s) associated with the determined node identity (or identities). Furthermore, operation 408 may be implemented such that the deleted data atom stubs are completely removed that have specific node identities with sync counters within their pedigrees less than the determined sync counter threshold(s) associated with the determined node identity (or identities). As such, operation 408 may be implemented in a wide variety of different ways.

Figure 5:
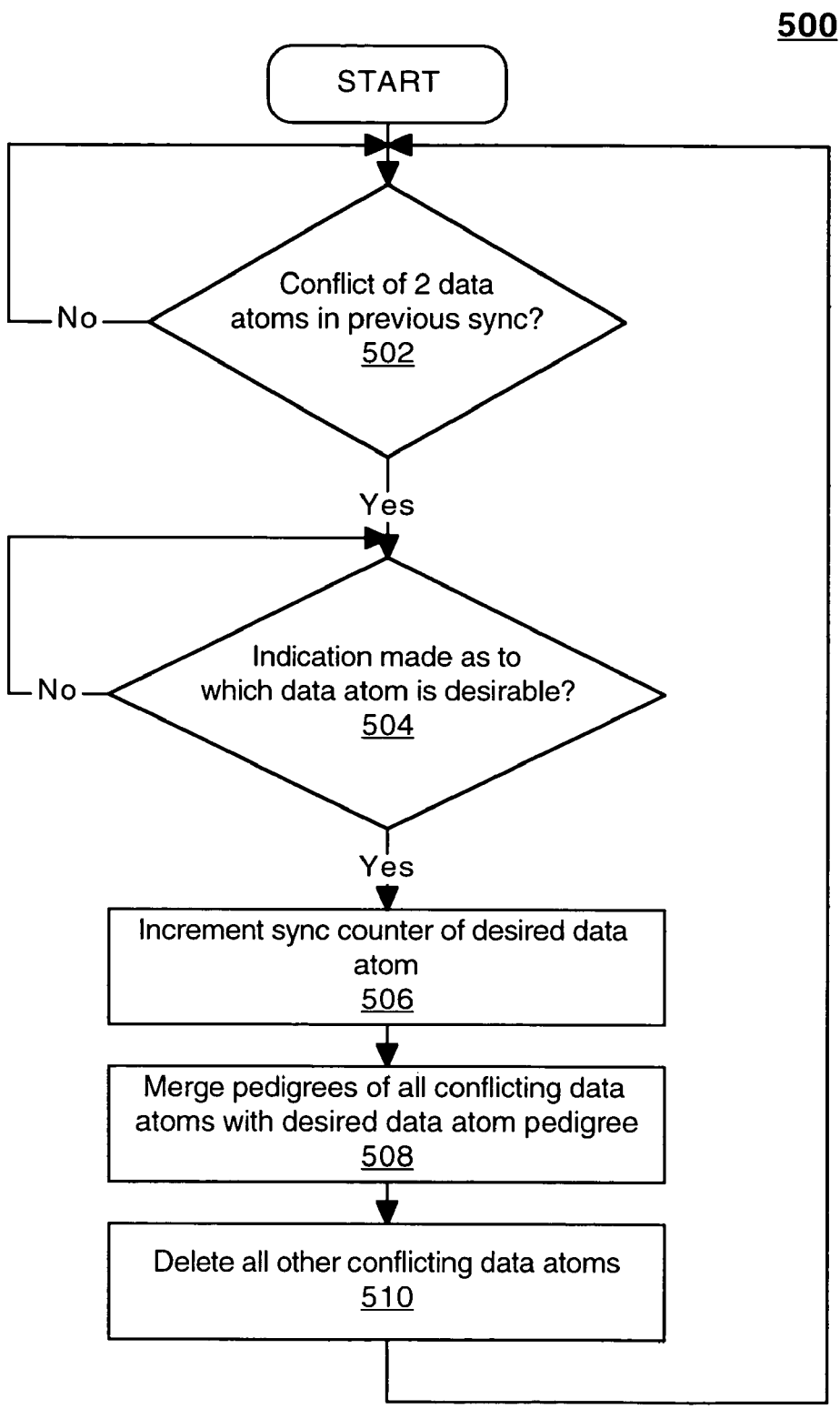
FIG. 5 is a flowchart of a method in accordance with embodiments of the present invention for enabling determination of priority between two conflicting data atoms.

FIG. 5 is a flowchart 500 of a method performed in accordance with embodiments of the present invention for enabling determination of priority between two conflicting data atoms. For example, if there exists two conflicting data atoms on a node resulting from a previous synchronization process, process 500 determines which data atom to maintain (or keep) and which one to delete. Process 500 may occur within a node after a synchronization process between the node and another node.

At operation 502, a determination can be made as to whether there are two or more conflicting data atoms that exist on a node as a result of a previous synchronization process. It is noted that conflicting data atoms can have identities that match (or are the same), but it cannot be determined from their pedigrees which data atom has priority. For example, a first data atom may have a pedigree equal to "A10B9" while a second data atom may have a pedigree equal to "A9B10", wherein the first and second data atoms have the same identifier. Since neither the first data atom nor the second data atom has priority, they can be referred to as conflicting data atoms. If it is determined at operation 502 that no conflicting data atoms exist on the node, process 500 proceeds to the beginning of operation 502. However, if it is determined at operation 502 that there is conflicting data atoms on the node, process 500 proceeds to operation 504.

At operation 504 of FIG. 5, a determination can be made as to whether an indication has been made as to which of the conflicting data atoms is desirable. It is noted that operation 504 can be implemented in a wide variety of ways. For example, an intelligent agent (e.g., a user) can indicate which conflicting data atom is desirable by selecting which data atom it wants to store on the node. Alternatively, an intelligent agent (e.g., a user) may edit (or modify) or merge the contents of the conflicting data atoms in a manner that indicates one of the data atoms is more desirable to it. If it is determined at operation 504 that an indication has not been made as to which conflicting data atom is desirable, process 500 proceeds to the beginning of operation 504. However, if it is determined at operation 504 that an indication has been made as to which conflicting data atom is desirable, process 500 proceeds to operation 506.

At operation 506, the node sync counter (or clock) can be incremented or forwarded by a particular value. Additionally, at operation 506, the node's identity and its current sync counter value can be included as part of the pedigree of the desirable data atom. It is understood that the pedigree of the desirable data atom (or item) can be implemented in any manner similar to that described herein, but is not limited to such. Note that the node sync counter may be incremented or forwarded in diverse ways at operation 506. For example, the node sync counter of the present embodiment can be advanced by an integer value of one. Alternatively, the node sync counter value may be advanced with any type of floating point number or integer number. Furthermore, the node sync counter value may be advanced by sampling a real-time clock value. It is understood that the sync counter of process 500 may be advanced (or incremented) in any manner similar to that described herein, but is not limited to such.

At operation 508 of FIG. 5, the pedigrees of all the conflicting data atoms can be merged with the pedigree of the desirable data atom. In this manner, the desirable data atom has a pedigree that takes priority over any of the other conflicting data atoms. At operation 510, all of the other conflicting atoms can be deleted (or disregarded) from the node and the desirable data atom can be stored (or used) for future use. Once operation 510 is completed, process 500 can proceed to the beginning of operation 502.

Figure 6:
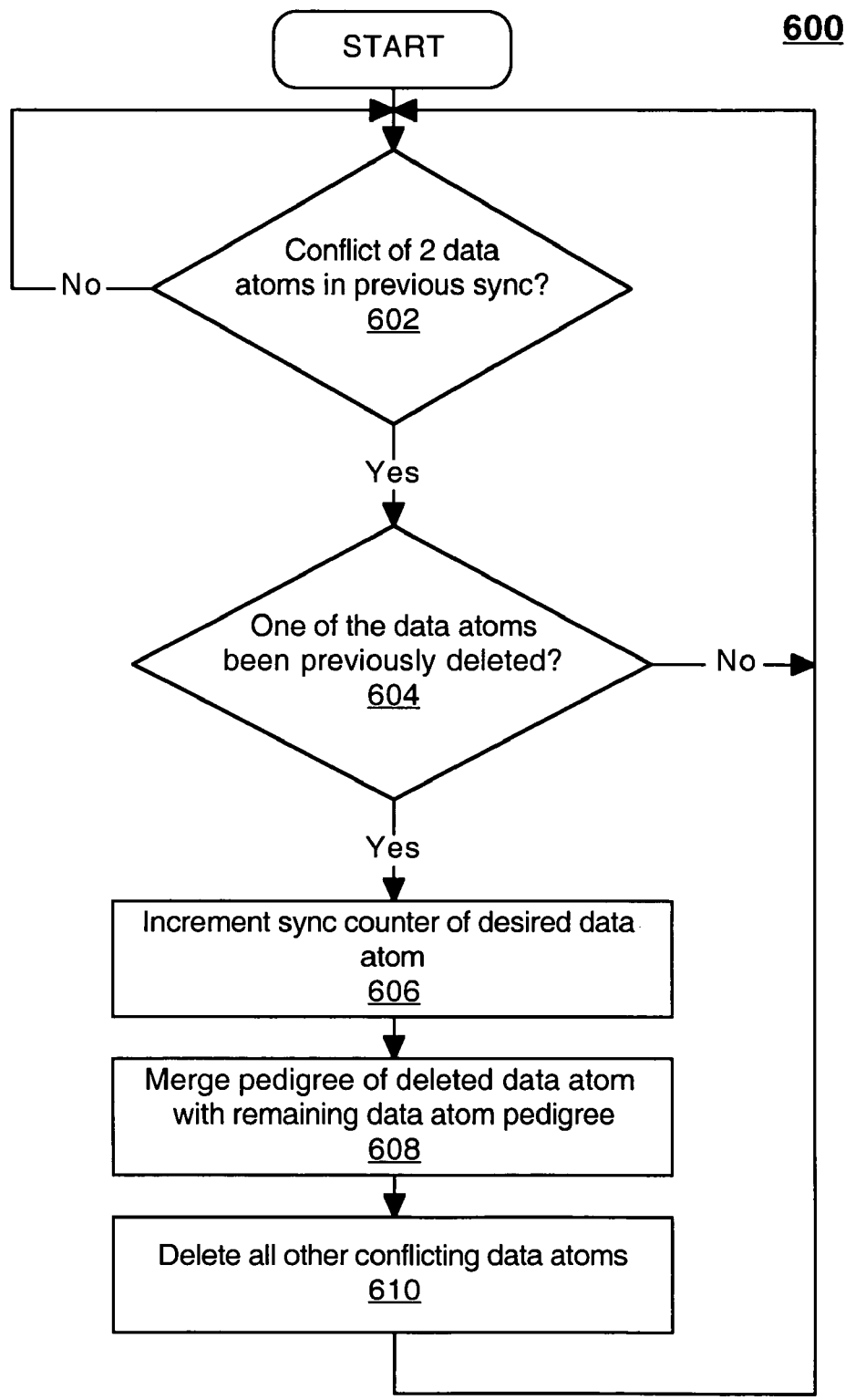
FIG. 6 is a flowchart of a method in accordance with embodiments of the present invention for enabling determination of priority between two conflicting data atoms, wherein one of them has been previously deleted.

FIG. 6 is a flowchart 600 of a method performed in accordance with embodiments of the present invention for enabling determination of priority between two conflicting data atoms, wherein one of them has been previously deleted. For example, if there exists two conflicting data atoms on a node resulting from a previous synchronization process and one of them has been deleted, process 600 determines which data atom to maintain (or keep) and which one to delete. Process 600 may occur within a node after a synchronization process between the node and another node.

At operation 602, a determination can be made as to whether there are two or more conflicting data atoms that exist on a node as a result of a previous synchronization process. It is noted that conflicting data atoms can be defined in any manner similar to that described herein, but are not limited to such. If it is determined at operation 602 that no conflicting data atoms exist on the node, process 600 proceeds to the beginning of operation 602. Conversely, if it is determined at operation 602 that there are conflicting data atoms on the node, process 600 proceeds to operation 604.

At operation 604 of FIG. 6, a determination can be made as to whether one of the conflicting data atoms has been previously deleted. If it is determined at operation 604 that none of the conflicting data atoms have been previously deleted, process 600 proceeds to the beginning of operation 602. However, if it is determined at operation 604 that one of the conflicting data atoms has been previously deleted, process 600 proceeds to operation 606.

At operation 606, the node sync counter (or clock) can be incremented or forwarded by a particular value. Furthermore, at operation 606, the node's identity and its current sync counter value can be included as part of the pedigree of the data atom that had not been previously deleted. It is understood that the pedigree of the non-deleted data atom (or item) can be implemented in any manner similar to that described herein, but is not limited to such. Note that the sync counter of operation 606 may be advanced (or incremented) in any manner similar to that described herein, but is not limited to such.

At operation 608 of FIG. 6, the pedigree of the data atom that had been previously deleted can be merged with the pedigree of the remaining data atom. In this manner, the remaining (or non-deleted) data atom has a pedigree that takes priority over the data atom that had been previously deleted.

At operation 610, the previously deleted conflicting data atom is deleted (or disregarded) by the node and the remaining data atom can be stored (or used) for future use. Once operation 610 is completed, process 600 can proceed to the beginning of operation 602.

Figure 7:
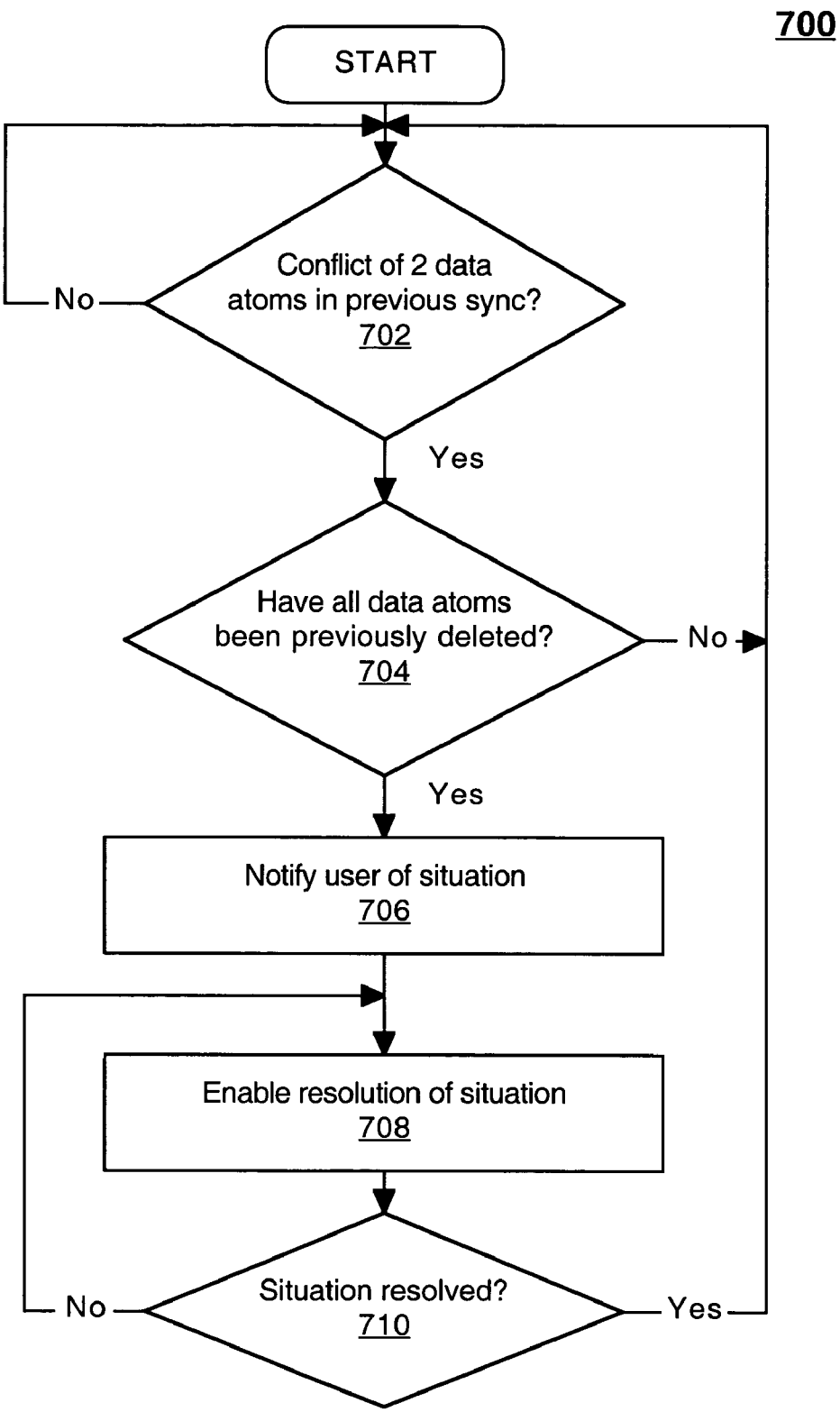
FIG. 7 is a flowchart of a method in accordance with embodiments of the present invention for enabling determination of priority between two conflicting data atoms, wherein all of them have been previously deleted.

FIG. 7 is a flowchart 700 of a method performed in accordance with embodiments of the present invention for enabling determination of priority between two conflicting data atoms, wherein all of them have been previously deleted. For example, if there exists two conflicting data atoms on a node resulting from a previous synchronization process and all of them have been deleted, process 700 enables resolution of the situation. Process 700 may occur within a node after a synchronization process between the node and another node.

At operation 702, a determination can be made as to whether there are two or more conflicting data atoms that exist on a node as a result of a previous synchronization process. It is noted that conflicting data atoms can be defined in any manner similar to that described herein, but are not limited to such. If it is determined at operation 702 that no conflicting data atoms exist on the node, process 700 proceeds to the beginning of operation 702. However, if it is determined at operation 702 that there are conflicting data atoms on the node, process 700 proceeds to operation 704.

At operation 704 of FIG. 7, a determination can be made as to whether all of the conflicting data atoms have been previously deleted. If it is determined at operation 704 that all of the conflicting data atoms have not been previously deleted, process 700 proceeds to the beginning of operation 702. Conversely, if it is determined at operation 704 that all of the conflicting data atoms have been previously deleted, process 700 can proceed to operation 706.

At operation 706, a user (or intelligent agent) of the node can be notified of the situation wherein all of the conflicting data atoms have been previously deleted. It is noted that the notification at operation 706 can be implemented in a wide variety of ways. For example, a visual message may be produced (or generated) and displayed at operation 706 in order to notify the node user. Alternatively, a voice message may be generated and audibly output at operation 706 to notify the node user. It is understood that operation 706 is not limited in any way to these exemplary embodiments.

At operation 708 of FIG. 7, resolution of the situation is enable by the present embodiment. It is appreciated that operation 708 may be implemented in diverse ways. For example, a choice may be presented at operation 708 to the node user (or an intelligent agent) for him or her to indicate which, if any, of the conflicting data atoms would he or she like to save (or keep). Alternatively, a choice may be presented at operation 708 to the user (or an intelligent agent) for him or her to indicate which, if any, of the conflicting data atoms would he or she like to delete (or discard). Furthermore, a choice may be presented at operation 708 to the user (or an intelligent agent) enabling him or her to modify, merge, edit, save, and/or delete the conflicting data atoms in order to resolve the situation.

At operation 710, a determination can be made as to whether the situation has been resolved. If it is determined at operation 710 that the situation has not been resolved, process 700 can proceed to the beginning of operation 708. Conversely, if it is determined at operation 710 that the situation has been resolved, process 700 can proceed to the beginning of operation 702.

Figure 8:
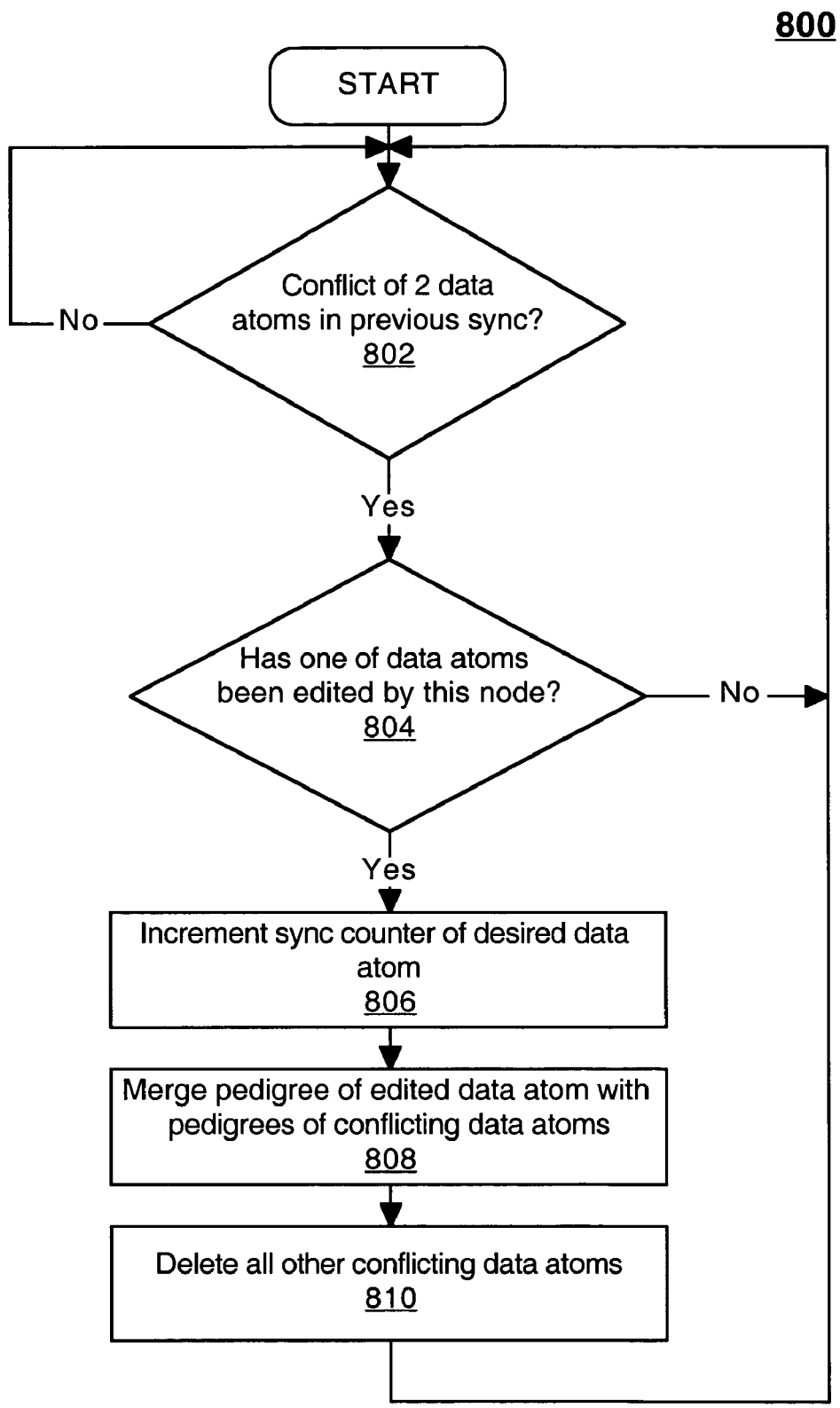
FIG. 8 is a flowchart of a method in accordance with embodiments of the present invention for enabling determination of priority between two conflicting data atoms, wherein one of them has been edited (or modified) by a node.

FIG. 8 is a flowchart 800 of a method performed in accordance with embodiments of the present invention for enabling determination of priority between two conflicting data atoms, wherein one of them has been edited (or modified) by a node. For example, if there exists two conflicting data atoms on the node resulting from a previous synchronization process and one of them has been edited by that node, process 800 maintains (or keeps) that edited data atom. Process 800 may occur within a node after a synchronization process between the node and another node.

At operation 802, a determination can be made as to whether there are two or more conflicting data atoms that exist on a node as a result of a previous synchronization process. It is noted that conflicting data atoms can be defined in any manner similar to that described herein, but are not limited to such. If it is determined at operation 802 that no conflicting data atoms exist on the node, process 800 proceeds to the beginning of operation 802. Conversely, if it is determined at operation 802 that there are conflicting data atoms on the node, process 800 can proceed to operation 804.

At operation 804 of FIG. 8, a determination can be made as to whether one of the conflicting data atoms has been edited by this node. If it is determined at operation 804 that none of the conflicting data atoms has been edited by this node, process 800 can proceed to the beginning of operation 802. However, if it is determined at operation 804 that one of the conflicting data atoms has been edited by this node, process 800 proceeds to operation 806.

At operation 806, the node sync counter (or clock) can be incremented or forwarded by a particular value. Moreover, at operation 806, the node's identity and its current sync counter value can be included as part of the pedigree of the data atom that has been edited by the node. It is understood that the pedigree of the edited data atom (or item) can be implemented in any manner similar to that described herein, but is not limited to such. It is noted that the sync counter of operation 806 may be advanced (or incremented) in any manner similar to that described herein, but is not limited to such.

At operation 808 of FIG. 8, the pedigrees of the conflicting data atoms can be merged with the pedigree of the data atom that had been edited by the node. In this manner, the edited data atom has a pedigree that takes priority over the conflicting data atoms. At operation 810, the conflicting data atoms are deleted (or disregarded) by the node and the edited data atom can be stored (or used) for future use. Once operation 810 is completed, process 800 can proceed to the beginning of operation 802.

Figure 9:
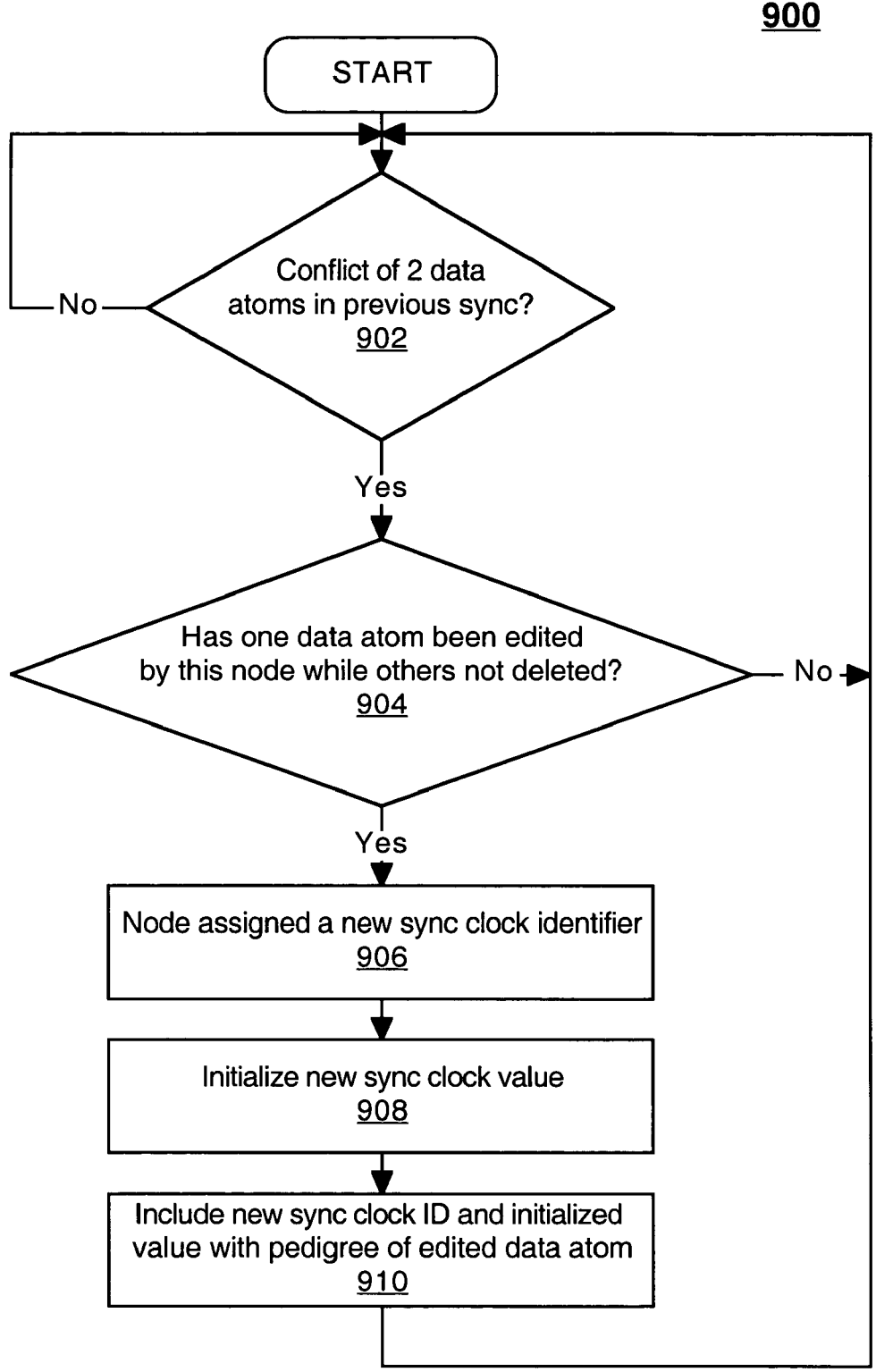
FIG. 9 is a flowchart of a method in accordance with embodiments of the present invention for enabling determination of priority between two conflicting data atoms, wherein one of them has been edited (or modified) by a node while the others have not been deleted.

FIG. 9 is a flowchart 900 of a method performed in accordance with embodiments of the present invention for enabling determination of priority between two conflicting data atoms, wherein one of them has been edited (or modified) by a node while the others have not been deleted. For example, if there exists two conflicting data atoms on the node resulting from a previous synchronization process and one of them has been edited by that node and the other has not been deleted, process 900 can provide a new sync clock identifier and value to the edited data atom while maintaining (or keeping) all of the conflicting data atoms. Process 900 may occur within a node after a synchronization process between the node and another node.

At operation 902, a determination can be made as to whether there are two or more conflicting data atoms that exist on a node as a result of a previous synchronization process. Note that conflicting data atoms can be defined in any manner similar to that described herein, but are not limited to such. If it is determined at operation 902 that no conflicting data atoms exist on the node, process 900 proceeds to the beginning of operation 902. Conversely, if it is determined at operation 902 that there are conflicting data atoms on the node, process 900 proceeds to operation 904.

At operation 904 of FIG. 9, a determination can be made as to whether one of the conflicting data atoms has been edited by this node and if the other conflicting data atoms have not been deleted. If it is determined at operation 904 that one of the conflicting data atoms has not been edited by the node or one of them has been deleted, process 900 proceeds to the beginning of operation 902. However, if it is determined at operation 904 that one of the conflicting data atoms has been edited by the node while the others have not been deleted, process 900 proceeds to operation 906.

At operation 906, the node can be assigned a new sync clock (or counter) identifier. It is noted that operation 906 can be implemented in a wide variety of ways. For example, the node may be assigned at operation 906 the new sync clock (or counter) identifier in a random manner. Alternatively, the node may be assigned at operation 906 the new sync clock (or counter) identifier in a predefined manner. Moreover, once the new sync clock (or counter) identifier is assigned to the node at operation 906, the node may utilize that identifier from that time forward. Alternatively, once the new sync clock (or counter) identifier is assigned to the node at operation 906, the node may utilize that identifier just for situations similar to that determined at operation 904.

At operation 908 of FIG. 9, the new sync clock (or counter) of the node can be initialize to a value. It is appreciated that operation 908 can be implemented in a wide variety of ways. For example, the value of the new sync counter can be initialize to a value equal to one. Furthermore, the value of the new sync counter can be initialize at operation 908 to any predefined value, such as but not limited to, an integer or floating point value.

At operation 910, the new sync clock identity (ID) and its initialized sync clock value can be included as part of the pedigree of the edited (or modified) data atom. So at this point, the pedigree of the newly edited data atom overrides its ancestor data atom, but it won't override the conflicting (or alternative) data atoms existing on the node. As such, the conflicting data atoms are not deleted or discarded when a conflict occurs, but instead can be maintained by the node. One of the possible reasons for this outcome can be the assumption that the node user (or an intelligent agent) is ignorant of the conflicting data atoms and may not want to lose data associated with one of the conflicting data atoms. Alternatively, another possible reason for this outcome can be the assumption that the node user (or an intelligent agent) is unconcerned by the conflicting data atoms since he or she edited one of them and did not delete the other conflicting data atoms.

It is understood that the pedigree of the modified (or edited) data atom (or item) at operation 910 can be implemented in any manner similar to that described herein, but is not limited to such. Once operation 910 has been completed, the process 900 can proceed to the beginning of operation 902.

Note that embodiments in accordance with the invention can be formed by any combination of methods 100, 200, 300, 400, 500, 600, 700, 800, and 900 of FIGS. 1, 2, 3, 4, 5, 6, 7, 8, and 9, respectively. Furthermore, two or more operations of methods 100, 200, 300, 400, 500, 600, 700, 800, and 900 can be combined to form embodiments in accordance with the invention.

Figure 10:
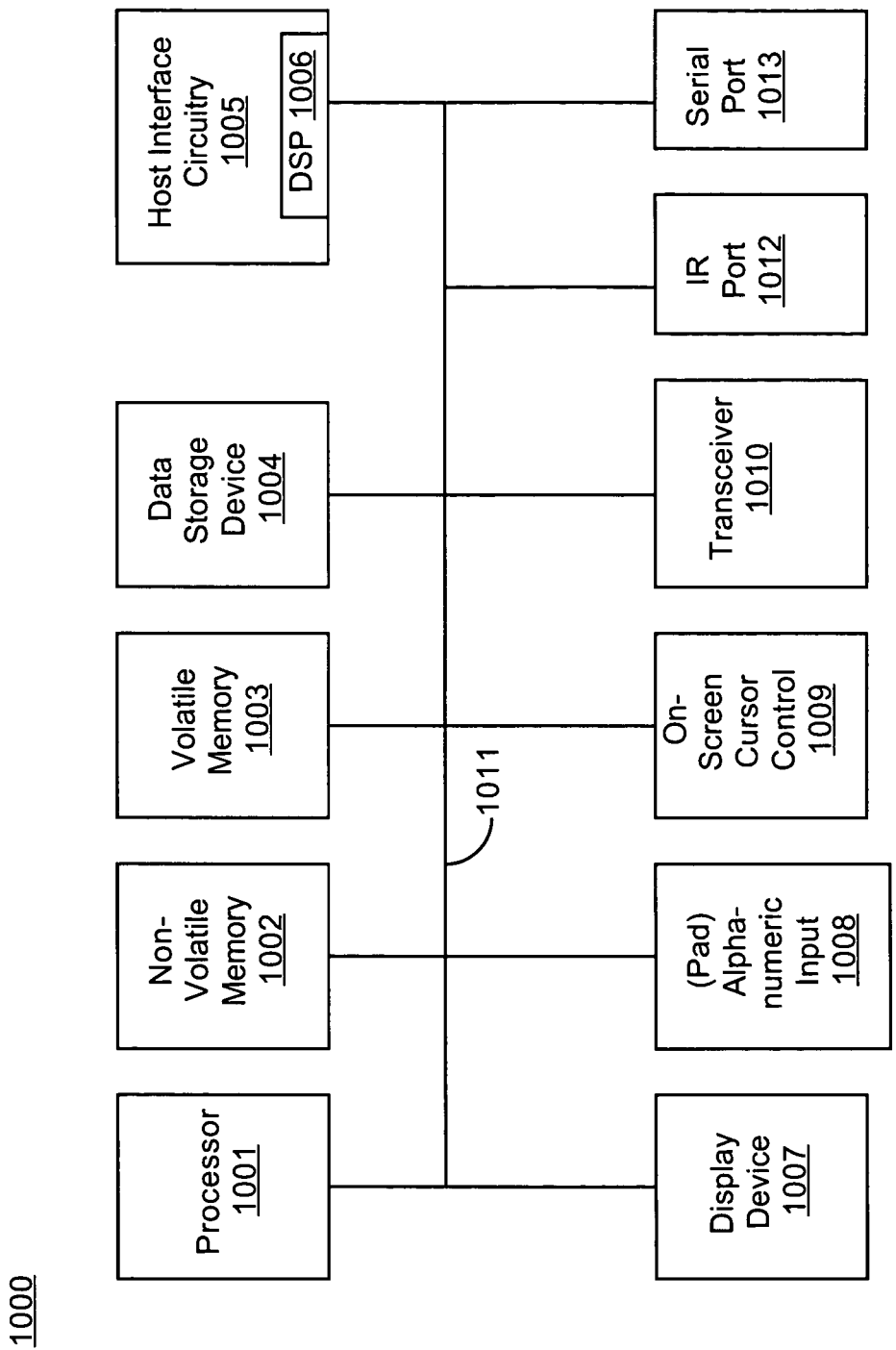
FIG. 10 is a block diagram of an exemplary handheld computing device upon which embodiments of the present invention may be practiced.

FIG. 10 is a block diagram of an embodiment of a device 1000 upon which embodiments of the present invention may be implemented. In one embodiment, device 1000 can be a handheld computing device, such as but not limited to, a personal digital assistant (PDA), a portable information device (PID), a mobile telephone, and the like. In its various implementations, device 1000 may not include all of the elements illustrated by FIG. 10, or device 1000 may include other elements not shown by FIG. 10.

In one embodiment, device 1000 can include an address/data bus 1011 for communicating information, a central processor 1001 coupled with the bus 1011 for processing information and instructions, volatile memory 1003, e.g., random access memory (RAM), static RAM, dynamic RAM, etc., coupled with the bus 1011 for storing information and instructions for the central processor 1001, and non-volatile memory 1002, e.g., read only memory (ROM), programmable ROM, flash memory, erasable programmable read only memory (EPROM), electrically erasable programmable read only memory (EEPROM), etc., coupled with the bus 1011 for storing static information and instructions for the processor 1001. In the present embodiment, device 1000 can also include an optional data storage device 1004 (e.g., a Secure Digital card, a Multi Media Card, or the like) coupled with the bus 1011 for storing information and instructions. Device 1004 can be removable. In one embodiment, device 1000 can contain a display device 1007 coupled to the bus 1011 for displaying information to a user.

In the present embodiment of FIG. 10, device 1000 can also include a signal transmitter/receiver (transceiver) device 1010, which is coupled to bus 1011 for providing a wireless radio (RF) communication link between device 1000 and other wireless devices. It is understood that transceiver 1010 may be coupled to device 1000 or integral with device 1000.

In one embodiment, device 1000 can include host interface circuitry 1005 coupled to bus 1011. Host interface circuitry 1005 can include an optional digital signal processor (DSP) 1006 for processing data to be transmitted or data that are received via transceiver 1010. Alternatively, processor 1001 can perform some or all of the functions performed by DSP 1006. In one embodiment, host interlace circuitry 1005 can include a universal asynchronous receiver-transmitter (UART) module that provides the receiving and transmitting circuits utilized for serial communication for both a serial port 1013 and an infrared (IR) port 1012.

In one embodiment, device 1000 of FIG. 10 can include an optional alphanumeric input device 1008 coupled with bus 1011 that, in one implementation, can be a handwriting recognition pad (e.g., "digitizer"). Alphanumeric input device 1008 can communicate information and command selections to processor 1001 via bus 1011. Device 1000 can also include an optional cursor control or directing device (on-screen cursor control 1009) coupled to bus 1011 for communicating user input information and command selections to processor 1001. In one implementation, on-screen cursor control device 1009 can be a touch screen device incorporated with display device 1007.

Figure 11:
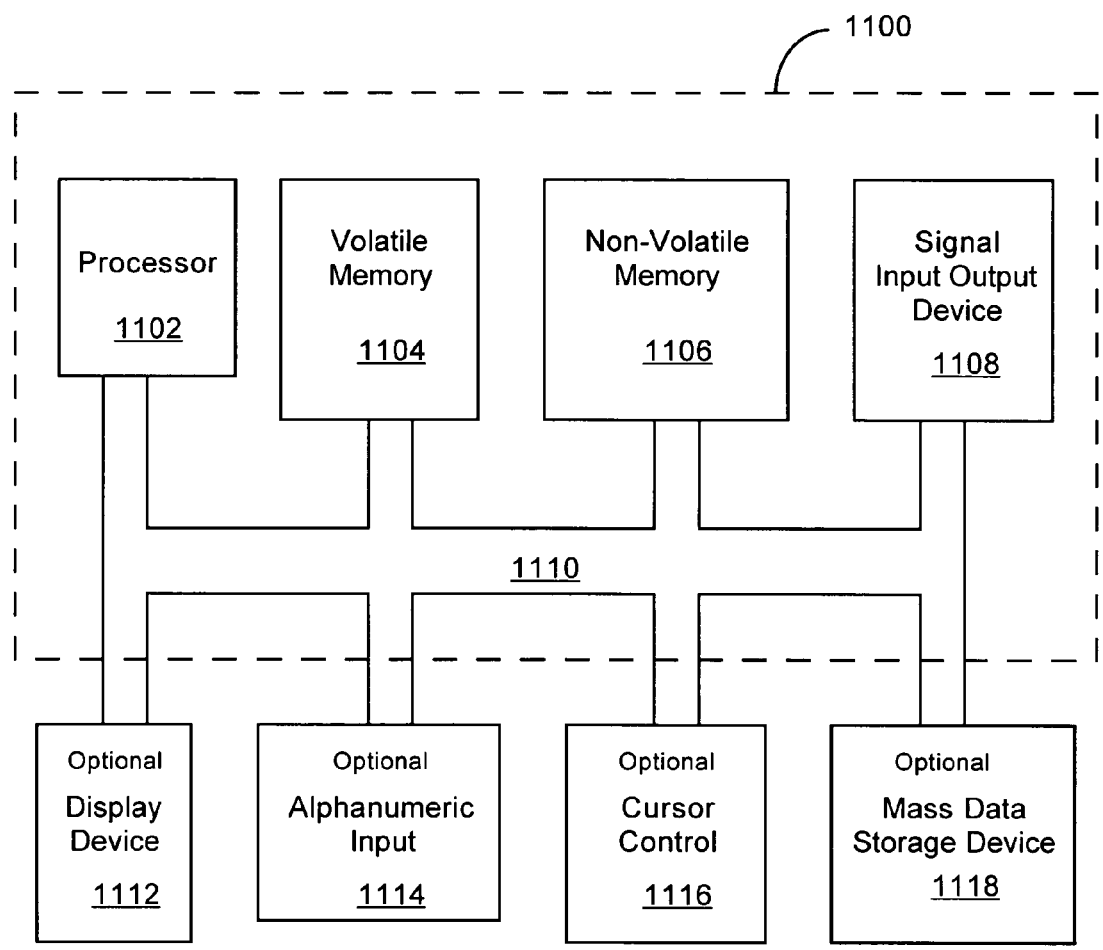
FIG. 11 is a block diagram of an exemplary computer system upon which embodiments of the present invention may be practiced.

FIG. 11 is a block diagram of an exemplary computer system 1100 that may be used in accordance with embodiments of the present invention. It is understood that system 1100 is not strictly limited to be a computer system. As such, system 1100 of the present embodiment is well suited to be any type of computing device (e.g., server computer, desktop computer, laptop computer, portable computing device, database computer, etc.). In its various implementations, system 1100 may not include all of the elements illustrated by FIG. 11, or system 1100 may include other elements not shown by FIG. 11. Within the discussions of embodiments in accordance with the present invention herein, certain processes and operations were discussed that may be realized, in some embodiments, as a series of instructions (e.g., software program) that reside within computer readable memory of computer system 1100 and executed by a processor(s) of system 1100. When executed, the instructions can cause computer 1100 to perform specific operations and exhibit specific behavior which are described herein.

Computer system 1100 can include an address/data bus 1110 for communicating information, one or more central processors 1102 coupled with bus 1110 for processing information and instructions. Central processor unit(s) 1102 may be a microprocessor or any other type of processor. The computer 1100 can also include data storage features such as computer usable volatile memory 1104, e.g., random access memory (RAM), static RAM, dynamic RAM, etc., coupled with bus 1110 for storing information and instructions for central processor(s) 1102, computer usable non-volatile memory 1106, e.g., read only memory (ROM), programmable ROM, flash memory, erasable programmable read only memory (EPROM), electrically erasable programmable read only memory (EEPROM), etc., coupled with bus 1110 for storing static information and instructions for processor(s) 1102.

System 1100 of FIG. 11 can also include one or more signal generating and receiving devices 1108 coupled with bus 1110 for enabling system 1100 to interface with other electronic devices. The communication interface(s) 1108 of the present embodiment may include wired and/or wireless communication technologies. For example, in one embodiment of the present invention, the communication interface 1108 is a serial communication port, but could also alternatively be any of a number of well known communication standards and protocols, e.g., a Universal Serial Bus (USB), an Ethernet adapter, a FireWire (IEEE 1394) interface, a parallel port, a small computer system interface (SCSI) bus interface, an infrared (IR) communication port, a Bluetooth wireless communication adapter, a broadband connection, and the like. In another embodiment, a cable or digital subscriber line (DSL) connection may be employed. In such a case the communication interface(s) 1108 may include a cable modem or a DSL modem.

Optionally, computer system 1100 can include an alphanumeric input device 1114 including alphanumeric and function keys coupled to the bus 1110 for communicating information and command selections to the central processor(s) 1102. The computer 1100 can also include an optional cursor control or cursor directing device 1116 coupled to the bus 1110 for communicating user input information and command selections to the processor(s) 1102. The cursor directing device 1116 can be implemented using a number of well known devices such as, but not limited to, a mouse, a track ball, a track pad, an optical tracking device, a touch screen, etc. Alternatively, it is appreciated that a cursor can be directed and/or activated via input from the alphanumeric input device 1114 using special keys and key sequence commands. The present embodiment is also well suited to directing a cursor by other means such as, for example, voice commands.

The system 1100 of FIG. 11 can also include an optional computer usable mass data storage device 1118 such as a magnetic or optical disk and disk drive (e.g., hard drive or floppy diskette) coupled with bus 1110 for storing information and instructions. An optional display device 1112 can be coupled to bus 1110 of system 1100 for displaying video and/or graphics. It should be appreciated that optional display device 1112 may be a cathode ray tube (CRT), flat panel liquid crystal display (LCD), field emission display (FED), plasma display or any other display device suitable for displaying video and/or graphic images and alphanumeric characters recognizable to a user.

It is noted that the components associated with system 1100 described above may be resident to and associated with one physical computing device. However, one or more of the components associated with system 1100 may be physically distributed to other locations and be communicatively coupled together (e.g., via a network).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to explain the principles of the invention and its practical application, to thereby enable others skilled in the art to utilize the invention and various embodiments with various modifications. It is intended that the scope of the invention be defined by the Claims appended hereto and their equivalents.

What is claimed is:

1. A method of synchronizing more than one data item comprising:
    determining, by using a computer, if a first data item and a second data item have matching identities and conflicting priorities after a synchronization process between a first node and a second node, wherein said determining if said first data item and said second data item have conflicting priorities comprises utilizing a first pedigree stored at said first node and associated with said first data item and a second pedigree stored at said second node associated with said second data item and wherein the first node and the second node are non-reference datasets;
    determining if an indication has been made that said first data item is desirable over said second data item, provided said first and second have matching identities and conflicting priorities;
    indicating said first data item has priority over said second data item, provided said indication has been made that said first data is desirable over said second data item, and
    deleting said second data item and storing said first data item, in response to said indicating said first data item has priority over said second data time, wherein the deleting the second item by utilizing a determined pedigree of sync counters to designate which data items to remove, wherein said indicating said first data item has priority over said second data item comprises advancing a synchronization counter value of said first pedigree, wherein said indicating said first data item has priority over said second data item further comprises merging said second pedigree with said first pedigree.

2. The method as described in claim 1 wherein said first node is selected from a handheld computing device, a computer system, a database, a data cache, a data store and a server.

3. The method as described in claim 1 further comprising: deleting said second data item and storing said first data item, in response to said indicating said first data item has priority over said second data item.

4. A computer implemented method of synchronizing more than one data items comprising:
    determining, by using a computer, if a first data item and a second data item have matching identities and conflicting priorities after a synchronization process between a first node and a second node, wherein said determining if said first data item and said second data item have conflicting priorities comprises utilizing a first pedigree stored at said first node and associated with said first data item and a second pedigree stored at said second node and associated with said second data item and wherein the first node and the second node are non-reference datasets;
    determining if said first data item or said second data item had been previously detected, provided said first and second data items have matching identities and conflicting priorities;
    indicating said first data item has priority over said second data item;
    deleting said second data item and storing said first data item, in response to said indicating said first data item has priority over said second data time, wherein the deleting the second item by utilizing a determined pedigree of sync counters to designate which data items to remove, wherein said indicating said first data item has priority over said second data item comprises advancing a synchronization counter value of said first pedigree, wherein said indicating said first data item has priority over said second data item further comprises merging said second pedigree with said first pedigree.

5. The computer implemented method as described in claim 4 wherein said first node is selected from a handheld computer, a computer system, a database, a data cache, a data store and a server.

6. The computer implemented method as described in claim 4 wherein said indicating said first data item and said second data item has priorities over said second data item, provided said second data item had been previously deleted.

7. A computer-usable memory storage having computer-readable code embodied therein for causing a computing device to perform a method of synchronizing more than one data items comprising:
- determining if a first data item and a second data item have matching identities and conflicting priorities after a synchronization process between a first node and a second node, wherein said determining if said first data item and said second data item have conflicting priorities comprises utilizing a first pedigree stored at said first node and associated with said first data item and a second pedigree stored at said second node and associated with said second data item and wherein the first node and the second node are non-reference datasets;
- determining if said first data item or said second data item has been modified by a node of said two nodes, provided said first and second data items have matching identities and conflicting priorities; and
- indicating said first data item has priority over said second data item, provided said first data item has been modified by said node;
- deleting said second data item and storing said first data item, in response to said indicating said first data item has priority over said second data time, wherein the deleting the second item by utilizing a determined pedigree of sync counters to designate which data items to remove, wherein said indicating said first data item has priority over said second data item comprises advancing a synchronization counter value of said first pedigree, wherein said indicating said first data item has priority over said second data item further comprises merging said second pedigree with said first pedigree.

8. The computer-usable memory storage of claim 7, wherein a node of said two nodes is selected from a handheld computer, a computer system, a database, a data cache, a data store and a server.

9. The computer-usable memory storage of claim 7 wherein said method further comprising: determining if said first data item or said second data item had been deleted, provided said first and second data items have matching identities and conflicting priorities.

* * * * *